(12) United States Patent
Yerli

(10) Patent No.: US 9,451,004 B2
(45) Date of Patent: Sep. 20, 2016

(54) TIMER-BASED INITIATION OF SERVER-BASED ACTIONS

(71) Applicant: Gface GmbH, Frankfurt am Main (DE)

(72) Inventor: Cevat Yerli, Frankfurt am Main (DE)

(73) Assignee: Crytek GmbH, Frankfurt am Main (DE)

( * ) Notice: Subject to any disclaimer, the term of this patent is extended or adjusted under 35 U.S.C. 154(b) by 868 days.

(21) Appl. No.: 13/759,962

(22) Filed: Feb. 5, 2013

(65) Prior Publication Data

US 2013/0205220 A1 Aug. 8, 2013

Related U.S. Application Data

(60) Provisional application No. 61/595,619, filed on Feb. 6, 2012.

(51) Int. Cl.
*H04L 29/08* (2006.01)
*G06F 3/0482* (2013.01)
*G06F 3/0484* (2013.01)
*H04L 29/06* (2006.01)

(52) U.S. Cl.
CPC .............. *H04L 67/02* (2013.01); *G06F 3/0482* (2013.01); *G06F 3/04842* (2013.01); *H04L 67/36* (2013.01); *H04L 69/28* (2013.01)

(58) Field of Classification Search
USPC .......................................... 715/748
See application file for complete search history.

(56) References Cited

U.S. PATENT DOCUMENTS

| | | | |
|---|---|---|---|
| 8,140,971 B2 * | 3/2012 | Branson | G06F 9/4446 715/705 |
| 2013/0198356 A1 | 8/2013 | Yerli | |

* cited by examiner

*Primary Examiner* — Jeffrey A Gaffin
*Assistant Examiner* — Sabrina Greene
(74) *Attorney, Agent, or Firm* — Christensen O'Connor Johnson Kindness PLLC

(57) ABSTRACT

This description relates to methods for initiating a server-based action using a timing mechanism. Furthermore, the description relates to the implementation of the aspects and embodiments of the method for initiating a server-based action described herein in hardware or software, or a combination thereof. The description suggests a mechanism to trigger the delayed execution of a server-based action based on hovering over interactive elements in a graphical user interface.

21 Claims, 16 Drawing Sheets

01 ORIGINAL STATE OF A BUTTON, MENU E.G.

02 VISUAL INDICATOR, THAT HOVER WILL APPEAR; HOVER IS TRIGGERED ONCE USER MOVES HIS MOUSE OVER 01 AND DOES NOT MOVE IT FOR X-TIME

03 VISUAL INDICATOR, THAT ORIGINAL STATE HAS BEEN MANIPULATED
04 HOVER ENABLES USER TO INTERACT IN A DEEPER LEVEL;
    CONTENT-RELATED INTERACTIONS CAN BE: BUY, RECOMMEND,
    ADD TO WISHLIST, PLAY, SAVE, SHARE

05 VISUAL INDICATOR, THAT HOVER WILL BE CLOSED; IT IS TRIGGERED
   ONCE USER MOVES HIS MOUSE OVER 01; SYSTEM REVERTS THE ORIGINAL STATE
06 VISUAL INDICATOR, THAT HOVER IS MANIPULATED

13 HOVER ENABLES USER TO INTERACT IN A DEEPER LEVEL LIKE MANAGING DELIVERY, BILLING ADDRESS AND PAYMENT METHOD, AND ALSO TO CHECKOUT E.G.
14 VISUAL INDICATOR, THAT ORIGINAL STATE HAS BEEN MANIPULATED

Fig. 8

15 VISUAL INDICATOR, THAT HOVER IS MANIPULATED
16 VISUAL INDICATOR, THAT HOVER WILL BE CLOSED; IT IS TRIGGERED ONCE USER MOVES HIS MOUSE OVER 11; SYSTEM REVERTS THE ORIGINAL STATE

120 ORIGINAL STATE OF CHECKOUT

300 CONFIRMATION OF "CLICKLESS" CHECKOUT

120 ORIGINAL STATE OF CHECKOUT

200 VISUAL INDICATOR, THAT "CLICKLESS" CHECKOUT HAPPENS; ACTION IS TRIGGERED ONCE USER MOVES HIS MOUSE OVER A PRICE AND DOES NOT MOVE IT FOR X-TIME

250 CONFIRMATION CHEKOUT; EITHER A CLICK OR ANOTHER HOVER

300 CONFIRMATION OF "CLICKLESS" CHECKOUT

TIMER-BASED INITIATION OF SERVER-BASED ACTIONS

CROSS-REFERENCE TO RELATED APPLICATION

This application claims the benefit of U.S. Provisional Patent Application No. 61/595,619, filed Feb. 6, 2012, the disclosure of which is incorporated by reference herein in its entirety.

TECHNICAL FIELD

This disclosure relates to methods for initiating a server-based action using a timing mechanism.

BACKGROUND

A graphical user interface (sometimes also referred to as the desktop) is an interactive space that can be considered a hub for human-to-machine interactions. Typically, the graphical user interface on modern computing devices allows for multitasking, e.g., by offering interactions with multiple applications and functions provided to the user, e.g., through multiple windows being concurrently displayed to the user.

The user is able to navigate in this graphical user interface by using one or more input peripherals of a computing device, e.g., a keyboard, specially designated keys of the computing device, pointing devices (e.g., pens or a computer mouse), or a touchpad, which are sometimes to be used in concert. Those input peripherals typically allow the user to select interactive elements on the graphical user interface (e.g., a window, button, menu elements, list elements, etc.) by first hovering over the element to be selected and then performing some predetermined operation, e.g., clicking or double-clicking the hovered element to initiate an action associated with the hovered element. It is desirable that the combination of operations to select and confirm an action is, on the one hand, intuitive and easy to use for the user, and on the other hand, designed such that errors and mistakes in the human-machine interaction can be avoided.

Many services in the Internet try to minimize the effort and the possibility of mistakes that users can make by simplifying their user interface and/or tailoring it to the users' specific needs. For example, in some user interfaces, a single click with a computer mouse can result in the quasi-autonomous initiation of a whole series of actions that are executed without allowing the user any control of the actions. Some users are actually suspicious of the short one-click actions that activate "hidden" processes the user cannot control or even recognize, although they might have agreed to this some time ago. Many users want to have a feeling of safety and transparency in their interaction with a computing device, especially when the device is used to access Internet services such as gaming platforms, online shops, social networks, etc.

Moreover, although a variety of different computing devices can be equipped with a variety of different input peripherals to allow for interaction with some graphical user interfaces, some of these devices may sometimes not provide the means to interact properly with a particular graphical user interface. Where possible, alternative means for performing necessary actions can be provided. For example, computing devices which do not allow for "clicking" on an interactive element of the user interface can provide for some other means for confirming actions. Hence, it may be desirable to allow the user of a computing device to trigger or confirm actions by other means than clicking a mouse button. Moreover, it appears further desirable to suggest a mechanism which allows the user to trigger server-based actions on a computing device which may not provide for conventional confirmation mechanisms, like "clicking" an interactive element by means of a mouse or keyboard.

SUMMARY

The present disclosure relates to the implementation of aspects and embodiments of methods for initiating a server-based action using a timing mechanism described herein in hardware or software, or a combination thereof. Accordingly, aspects of the description cover implementations entirely in hardware, entirely in software, or an embodiment combining software and hardware aspects.

One aspect of the description is to suggest a mechanism to allow the user of a computing device to trigger a server-based action by hovering over an interactive element of a user interface that is displayed to the user. For example, the computing device may show a pointer on the user interface that can be moved by some input peripheral of the computing device and the user may move the pointer over an interactive element on the user interface to cause a hovering event. The notification of the hovering (event) on an interactive element is provided by the computing device to a server which provides a server-based action associated with the interactive element. In one exemplary implementation, the notification from the computing device triggers the server to execute the server-based action in a delayed manner, e.g., controlled by an activation timer at the server. The initiation of the server-based action may be communicated back from the server to the computing device.

In a more advanced exemplary implementation, the computing device informs the server in case the interactive element is no longer hovered over, so that the server can stop the delayed initiation of the server-based action, e.g., by stopping the activation timer.

Moreover, in another more advanced exemplary implementation, hovering over an interactive element for a predetermined amount of time may cause the server to provide the computing device with one or more further interactive elements that are visually presented to the user for further selection of an associated server-based action in a similar fashion as described above. This way, the design of cascaded user interfaces becomes possible.

One exemplary embodiment of the description relates to a method for initiating a server-based action. According to this method, a user interface is displayed on a display of a computing device. The user interface has at least one interactive element. Each interactive element is thereby associated with a server-based action. For example, an input peripheral of the computing device can be used to move a pointer over an interactive element (hovering event). A notification of this event is provided to a server to thereby cause a timer associated with the respective server-based action to be started at the server, and upon expiration of the timer at the server, the server initiates the server-based action associated with the interactive element being hovered over. An interactive element being hovered over is also referred to herein as a hovered interactive element.

The user interface could be, for example, displayed by a web browser application on the computing device or a gaming application or application for a social network or, in general, an interfacing application providing access to a web-based application executed on the server. Hence, in one exemplary implementation, the server provides functionality of a gaming network, social network, or an online platform, and the interactive elements are associated with server-based actions of the social network or online platform. In one exemplary implementation, the user interface is streamed from the server to the computing device as a multimedia stream.

In a more detailed exemplary embodiment, the server further informs the computing device on the initiation of the server-based action. The computing device provides information to the user, wherein the information is indicative of the server-based action having been initiated. The information can be provided to the user in different ways and can also have different content. For example, the information is provided to the user visually on the user interface and/or acoustically (e.g., using a speaker integrated in or attached to the computing device).

If displaying the information to the user, this may be, for example, realized in an overlay fashion within the graphical user interface. For example, assuming that the hovered interactive element is part of a window presented to the user as part of the graphical user interface, the information indicative of the server-based action having been initiated could be displayed as an overlay element in the window, without changing the focus of the window.

In another example, the information indicative of the server-based action having been initiated could also be a further interactive element (or multiple further interactive elements) associated with a further server-based action (or multiple further server-based actions). In this example, the interactive element that is hovered over first for a predetermined amount of time could initiate the display of further interactive elements, which may be, for example, used to realize a cascaded interaction, such as, for example, a menu with different menu levels the user can select from. Also, in case of presenting multiple interactive elements in a cascaded fashion, this may be realized by displaying the individual interactive elements as an overlay of a window in the graphical user interface.

In a further example, the information indicative of the server-based action having been initiated may also provide a user interface for interfacing with the initiated server-based action. For instance, in case the server-based action associated with the hovered interactive element is a chat application (e.g., in a gaming network or social network), the information provided by the server to the computing device may be the graphical user-interface of the chat application.

In various described embodiments, the computing device is capable of monitoring a pointer that can be moved by some input peripheral (e.g., a computer mouse, touchpad, input pen, input keys, etc.) on the graphical user interface. This monitoring may be continuous or event triggered (e.g., by interrupts). In another exemplary embodiment of the description, a mechanism is suggested to allow the interruption of the server-based timing mechanism to initiate the server-based action. For this mechanism, the computing device further informs the server that the interactive element is no longer hovered over by the pointer, and the server can interrupt the timer for the associated server-based action. For example, the computing device could listen to hover events (i.e., the pointer is moved over an interactive element) and un-hover events (i.e., the pointer is moved outside an interactive element) that are triggered in response to the movement of the pointer by the user and notify the server on these events by respective messages.

In another embodiment of the description, the computing device may also comprise some means that allow the user to immediately select/trigger a server-based action that is associated with an interactive element displayed to him/her on the user interface. For example, some input peripheral may be used to trigger such immediate selection/triggering of a server-based action, e.g., by the user pressing a predetermined key, clicking on a mouse button, etc. It should be noted that this immediate selection/triggering of a server-based action is optional. In this embodiment of the description, the computing device confirms the server-based action associated with the hovered interactive element by the user using an input peripheral of the computing device while the timer is running at the server (respectively, while the pointer is still hovering over the interactive element). In response to this confirmation of the server-based action by the user, the computing device informs the server on the confirmation of the server-based action by the user and the server initiates the server-based action at the server in response to the information received from the computing device.

In a further embodiment of the description, the computing device starts an initiation timer in response to the pointer being hovered over the interactive element and displays the initiation timer on the user interface for indicating the time left before the hovering of the interactive element starts the associated server-based action at the server. The initiation timer at the computing device may be, for example, started in response to the server confirming the start of the timer associated with the server-based action at the server.

Moreover, in one exemplary implementation, the computing device could display the initiation timer on the user interface in close proximity to the hovered interactive element (e.g., next to the interactive element), so that the user is visually informed on the server-based action being initiated in case he/she maintains the pointer hovered on the interactive element.

As already indicated above, a server-based action associated with a (first) interactive element may cause the server to provide one or more further interactive elements to the computing device for display and selection to the user. In another exemplary embodiment of the description, the initiated server-based action associated with the hovered interactive element for which the server-based timer expired causes the server to transmit at least one further interactive element to the computing device, each further interactive element being associated with a server-based action. Moreover, information displayed on the user interface of the computing device display includes the at least one further interactive element for selection by the user.

In one exemplary implementation in accordance with this embodiment of the description, the further interactive element is displayed in close proximity to (e.g., next to) the hovered interactive element to represent a menu structure from which the user can select.

In a further exemplary implementation, the computing device could start a deactivation timer in response to the display of the at least one further interactive element, and could display the deactivation timer on the user interface for indicating the time left before deactivating the at least one further interactive element displayed on the user interface. Optionally, upon expiration of the deactivation timer, the at least one further interactive element may be removed from (not displayed on) the user interface.

Moreover, in another exemplary implementation the user hovers a pointer over a further interactive element on the user interface using an input peripheral of the computing device. The computing device informs a server on the pointer being hovered over said further interactive element associated with a respective server-based action to thereby cause a timer associated with the respective server-based action to be started at the server. Upon expiration of the timer at the server, the server initiates the server-based action associated with said hovered further interactive element.

In one further embodiment of the description, an interactive element is associated with a special data structure or object maintained in a memory of the server. This special data structure or object is also referred to herein as a seed. In one example implementation, the interactive element may be thus associated with a seed maintained by the server. Furthermore, the initiation timer at the server may be associated with said seed or may be part of its functionality.

Further aspects of the description are related to the implementation of the aspects and embodiments of the method for initiating a server-based action described herein in hardware or software, or a combination thereof. Accordingly, aspects of the description cover implementations entirely in hardware, entirely in software (including microcode, firmware, resident software, code of the operating system, etc.) or an embodiment combining software and hardware aspects that are all generally referred to as a "circuit," "module," or "system."

In line with these further aspects, one embodiment of the description is related to a computer server. This computer server may include a transmission circuit that provides to a computing device a user interface for display to a user of the computing device. The user interface may, for example, have at least one interactive element associated with a server-based action. Moreover, the computer server may include a reception circuit that receives from the computing device an activation message that a pointer hovered over an interactive element associated with a respective server-based action. The computer server may further have a timer circuit that starts an activation timer associated with the respective server-based action in response to receiving said activation message from the computing device, and a processing circuit that initiates the server-based action associated with the hovered interactive element upon expiration of the activation timer.

As noted previously, the computer server could, for example, provide functionality of a social network or an online platform and the interactive elements are associated with server-based actions of the social network or online platform. Optionally, the computer server can be adapted to stream the user interface to the computing device as a multimedia stream.

In another exemplary embodiment of the description, the transmission circuit further transmits a message to the computing device to inform the computing device on the initiation of the server-based action. This information transmitted to the computing device may, for example, include at least one further interactive element, each further interactive element being associated with a further server-based action, or a user interface for interfacing with the initiated server-based action.

In a further embodiment of the description, the reception circuit receives an interrupt message from the computing device informing the computer server that the interactive element is no longer hovered over by the pointer, and the timer circuit interrupts the timer for the associated server-based action responsive to the interrupt message.

In an embodiment of the description, the computer server's reception circuit further receives a confirmation message for a server-based action associated with an interactive element from the computing device indicating to the computer server to initiate the server-based action for which a timer is running at the computer server for said server-based action. Moreover, the processing circuit initiates the server-based action in response to the confirmation message received from the computing device.

Moreover, in another embodiment of the description, the transmission circuit transmits a confirmation message to the computing device to confirm the start of the activation timer associated with the server-based action at the computer server.

In a further embodiment of the description, the initiated server-based action is associated with the hovered interactive element for which the expired server-based timer is causing the transmission circuit of the computer server to transmit at least one further interactive element to the computing device, wherein each further interactive element can be associated with a server-based action.

In an example implementation of this embodiment, the reception circuit further receives another activation message from the computing device, wherein the other activation message indicates that a pointer hovered over a further interactive element associated with a respective server-based action. Moreover, the timer circuit starts another activation timer associated with the respective server-based action in response to receiving said other activation message from the computing device. Further, the processing circuit initiates the server-based action associated with said hovered further interactive element upon expiration of the other activation timer.

In line with these further aspects, one embodiment of the description is related to a computing device. This computing device may have a display for displaying a user interface. The user interface has at least one interactive element associated with a server-based action. The computing device can further include an input peripheral for providing input to the computing device, wherein the input peripheral allows the user to hover a pointer over an interactive element on the user interface.

Moreover, the computing device can have a transmission circuit that transmits an activation message to a server, wherein the activation message informs the server on the pointer being hovered over an interactive element associated with a respective server-based action. Further, the computing device may have a reception circuit that receives a message from the server informing the computing device on the initiation of the server-based action, and an output circuit that provides visual and/or acoustical information to the user, wherein the information is indicative of the server-based action having been initiated.

In the computing device according another embodiment of the description, the transmission circuit transmits an interrupt message to cause an interruption of the activation timer running for a server-based action at the server.

In a further embodiment of the description, the computing device's input peripheral receives a confirmation of the server-based action associated with the hovered interactive element by the user while the activation timer associated with the server-based action is running at the server. Furthermore, the transmission circuit transmits, in response to the confirmation of the server-based action by the user, a confirmation message to the server to cause an immediate initiation of the server-based action at the server.

The computing device according to another embodiment of the description comprises a timer circuit that starts an initiation timer in response to the pointer being hovered over the interactive element. Moreover, the display is caused to display the initiation timer on the user interface in close proximity to the hovered interactive element for indicating the time left before the hovering of the interactive element starts the associated server-based action at the server.

In a more detailed exemplary implementation, the timer circuit starts the initiation timer in response to the reception circuit receiving a confirmation message from the server that conforms the start of the timer associated with the server-based action at the server.

In another exemplary embodiment, the initiated server-based action associated with the hovered interactive element for which the server-based timer expired is causing the server to transmit at least one further interactive element to the computing device, each further interactive element being associated with a server-based action. In this embodiment of the description, the display of the computing device displays the at least one further interactive element for selection by the user.

In an exemplary implementation of this embodiment, the further interactive element is displayed in close proximity to the hovered interactive element to represent a menu structure from which the user can select.

Furthermore, in another exemplary implementation, the computing device may further have a timer circuit that starts a deactivation timer in response to the display of the at least one further interactive element. Moreover, the display is caused to display the deactivation timer on the user interface for indicating the time left before the deactivating the at least one further interactive element displayed on the user interface.

The computing device according to an even more detailed implementation further comprises a processing circuit that causes the display to remove the at least one further interactive element from the displayed user interface upon expiration of the deactivation timer.

In another exemplary embodiment of the description, the computing device's transmission circuit transmits, in response to the user hovering a pointer over a further interactive element on the user interface using the input peripheral, another activation message to thereby cause an activation timer associated with a respective server-based action to be started at the server.

In line with the aspects of the description, another embodiment of the description is providing a computer readable medium storing instructions that when executed by a processor of a server computer cause the server computer to: provide to a computing device a user interface for display to a user of the computing device, the user interface having at least one interactive element associated with a server-based action; receive from the computing device an activation message that a pointer hovered over an interactive element associated with a respective server-based action; start an activation timer associated with the respective server-based action in response to receiving said activation message from the computing device; and initiate the server-based action associated with the hovered interactive element upon expiration of the activation timer.

Further in line with the aspects of the description, another embodiment of the description is providing a computer readable medium storing instructions that when executed by a processor of a computing device cause the computing device to: display a user interface, the user interface having at least one interactive element associated with a server-based action; control an input peripheral of the computing device, wherein the input peripheral allows the user to hover a pointer over an interactive element on the user interface; transmit an activation message to a server, wherein the activation message informs the server on the pointer being hovered over an interactive element associated with a respective server-based action; receive a message from the server informing the computing device on the initiation of the server-based action; and provide a visual and/or acoustical information to the user, wherein the information is indicative of the server-based action having been initiated.

DESCRIPTION OF THE DRAWINGS

In the following, the description is described in more detail in reference to the attached figures and drawings. Similar or corresponding details in the figures are marked with the same reference numerals.

FIGS. 6-9 show the user interface presented to the user of the computing device while execution of the method according to FIG. 1 proceeds, according to a second exemplary embodiment of the description;

DETAILED DESCRIPTION

Figure 1:
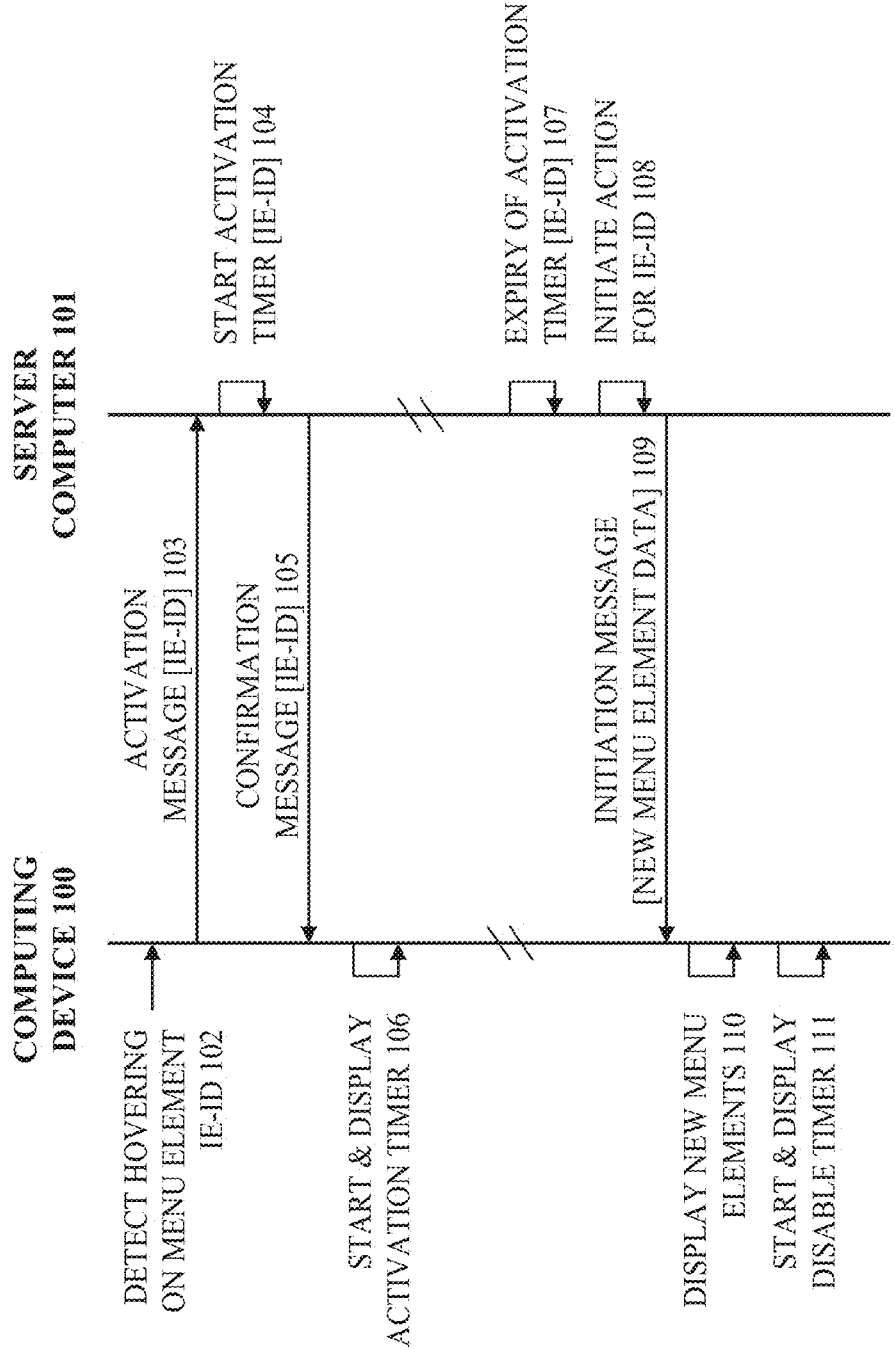
FIG. 1 shows a method for initiating a server-based action according to an exemplary embodiment of the description.

The description suggests a mechanism to allow the user of a computing device to trigger a server-based action by hovering over an interactive element of a user interface that is displayed to the user. A computing device may be, for example (but not limited to), a laptop, PC, tablet PC, Personal Digital Assistant (PDA), mobile phone, smartphone, or a gaming console. In comparison to existing methods, this description allows the user to start an action by the hover action without finalizing or initiating it immediately.

In one example, the computing device may be provided with some input peripheral that allows moving a pointer on a user interface displayed to the user on some display. The user may move the pointer over an interactive element on the user interface to cause a hovering event.

For example, the user could move a pointer on some menu, button, or hyperlink to cause the hovering event to be recognized by the computing device. The user interface can be, for example, presented to a user in full-screen mode, within a window, as part of an Internet-based or network-based application accessed through a browser application, or the like, but also other means of presenting a user interface to the user are encompassed in this description. Furthermore, in other exemplary embodiments of the description, the data for display of the user interface is streamed from a server to the computing device, e.g., as a multimedia stream, through a local network or the Internet depending on the server's location.

The hovering (event) on an interactive element is notified by the computing device to a server which is providing a server-based action associated with the interactive element. In one exemplary implementation, the notification from the computing device triggers the server to start the server-based action in a delayed manner, e.g., controlled by an activation timer at the server. Such delay may be on the order of seconds, e.g., 500 ms, 1 s, 2 s, 3 s, 4 s, or 5 s, or the like. The delay may be user-configurable. Moreover, the delay may also be selected based on the amount of information presented in combination with the interactive element. For example, the more content that needs to be grasped by the user, the longer the delay before triggering the associated action. In another example, the delay defined for interactive elements that are used for displaying a user menu may be shorter than a delay defined for an interactive element that is approving a purchase of the user.

In some embodiments of the description, the triggered server-based action is a function within a game environment, a social network, or the like, but the description is not limited thereto.

The initiation of the server-based action may also be communicated back from the server to the computing device. This may be advantageous, as it enables the computing device to inform the user on the start of the initiation timer at the server, so that he/she is aware of the server-based action being triggered in case he/she stays hovering over the interactive element. Optionally, the user can acknowledge and instantly trigger the execution of the server-based action by "clicking" with an input peripheral.

In this connection, the computing device may be advantageously operable to monitor whether an interactive element is hovered and whether it stays hovered. Accordingly, the computing device may provide functionality, for example, as part of the operating system or firmware of the computing device, to trigger events (or interrupts) that indicate the user hovering the pointer over a given interactive element (hover event) or that indicate that the user is moving the pointer off a given interactive element ("unhover" event). Hence, in an already more advanced exemplary implementation, the computing device informs the server in case the interactive element is no longer hovered, so that the server can stop the delayed initiation of the server-based action, e.g., by stopping the activation timer.

In an exemplary embodiment of the description, the computing device starts an initiation timer in response to the pointer being hovered over the interactive element and displays the initiation timer on the user interface for indicating the time left before the hovering of the interactive element starts the associated server-based action at the server. This may be useful in order to provide the user of the computing device with a visual indication that the hovering of the interactive element is about to initiate a server-based action associated therewith. The initiation timer at the computing device may be, for example, started in response to the server confirming the start of the timer associated with the server-based action at the server. For example, the computing device could display the initiation timer on the user interface in close proximity to the hovered interactive element (e.g., next to the interactive element), so that the user is informed on the server-based action being initiated in case he/she maintains the pointer hovered on the interactive element.

Moreover, as already indicated above, different actions may be triggered on the server. In one example, an interactive element initially displayed as part of the graphical user interface is part of a multi-level menu allowing the user to access server-based functionality. To implement a multi-level menu, a server-based action associated with a (first) interactive element may cause the server to provide one or more further interactive elements to the computing device for display and selection to the user. In another exemplary embodiment of the description, the initiated server-based action associated with the hovered interactive element for which the server-based timer expired is causing the server to transmit at least one further interactive element to the computing device, each further interactive element being associated with a server-based action. Hence, the server-based action associated with the top-level interactive element is causing the server to provide the relevant data for displaying the interactive elements of the next lower menu level. In one exemplary implementation, the further interactive elements that represent the next menu level are then displayed in close proximity to (e.g., next to) the hovered interactive element to represent the next level in the menu structure from which the user can select.

In a further exemplary implementation, the computing device could start a deactivation timer in response to the display of the at least one further interactive element representing the next level of the menu structure. The deactivation timer may be displayed to the user on the user interface in order to indicate the time left for the user to hover on one of the interactive elements of the next menu level before deactivating the at least one interactive element of the next menu level displayed on the user interface. Optionally, upon expiration of the deactivation timer, the at least one further interactive element of the next menu level is "removed" from the user interface, e.g., by fading them out.

Moreover, in another exemplary implementation the user hovers a pointer over a further interactive element on the user interface using an input peripheral of the computing device. The computing device informs a server on the pointer being hovered over said further interactive element associated with a respective server-based action to thereby cause a timer associated with the respective server-based action to be started at the server. Upon expiration of the timer at the server, the server initiates the server-based action associated with said hovered further interactive element.

FIG. 1 shows a method for initiating a server-based action according to an exemplary embodiment of the description, which will be discussed under consideration of FIGS. 2 to 5, illustrating an exemplary user interface displayed to the user of the computing device during the different steps of execution of the method according to FIG. 1.

Figure 2:
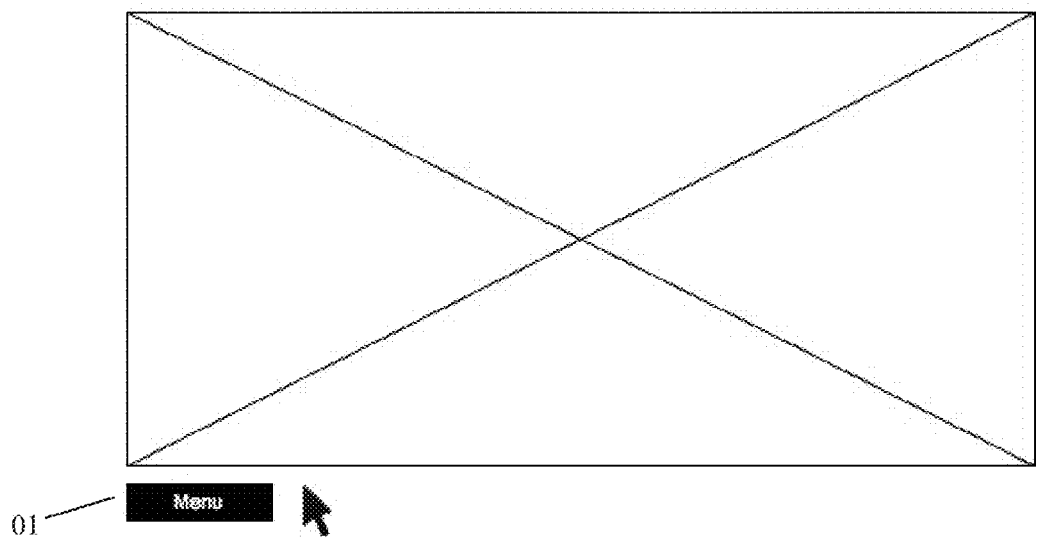
FIGS. 2-5 show the user interface presented to the user of the computing device while execution of the method according to FIG. 1 proceeds, according to a first exemplary embodiment of the description.

As shown in FIG. 2, the user may be presented with a graphical user interface in which an interactive element, in this example a "Menu" button 01, is shown to the user of the computing device 100 in its original state. As indicated in FIG. 2, a pointer (arrow), which can be moved by some input peripheral of the computing device 100, is also displayed on the user interface.

Figure 3:
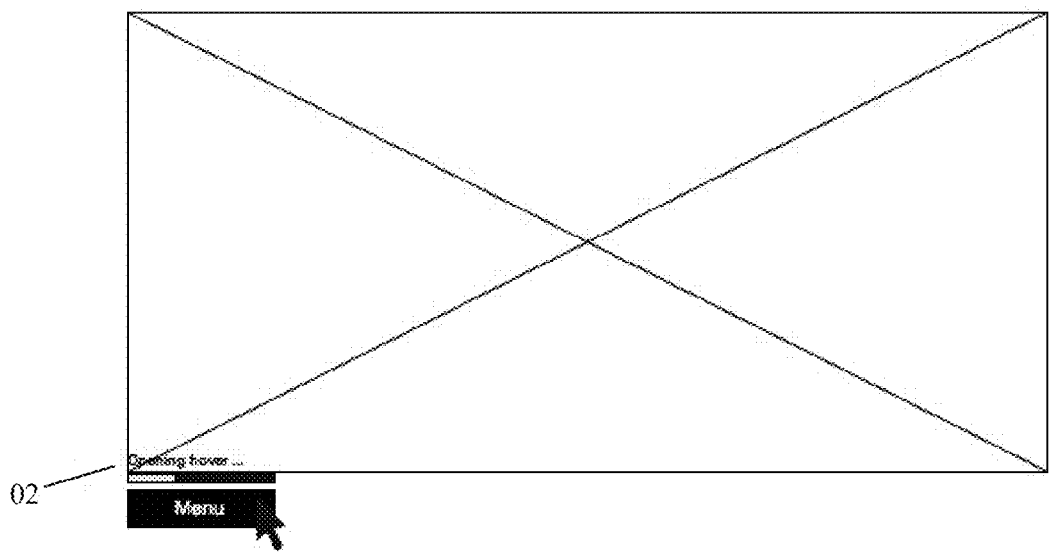

The user moves the pointer to hover over the interactive element, i.e., the "Menu" button in this example, as shown in FIG. 3. This causes a hover event to be detected 102 by a program running on the computing device (e.g., the operating system, some application, etc.), which is causing a notification to be sent 103 from the computing device to the server computer 101 which is providing a server-based action that is associated with the interactive element. For example, the association between the interactive element and the server-based function may be provided in the form of a link, or general data, which is already defined by the server when providing the interactive element. In the exemplary method of FIG. 1, the computing device 100 sends an activation message to the server computer 101 which is including an identification of the interactive element (IE-ID)

that triggered the message and/or an identification of the server-based function to be triggered in a delayed fashion.

The server computer 101 receives the activation message and starts 104 an activation timer for the server-based action. The activation message may, for example, comprise an indication of the interactive element, e.g., by means of an element identifier. This indication allows the server computer 101 to either start the activation timer for the particular interactive element, or alternatively, the server can identify the seed of the interactive element, which can then be responsible for starting and maintaining the activation timer.

In the exemplary embodiment of FIG. 1, the server computer 101 further responds 105 to the activation message by sending a response message to the computing device 100. This response message may, for example, indicate the interactive element (IE-ID) for which the activation message has been sent in order to allow the computing device to associate the response message to the corresponding activation message of step 103. Furthermore, as exemplified in FIG. 3, the computing device may optionally start 106 an activation timer locally in the computing device and displays a visual indicator 02 of the running timer to the user. The time bar in FIG. 3 shows the time left before the server-based action is executed by the server computer 101, if the user maintains the pointer hovered over the interactive element.

The timer may be, for example, displayed in the close proximity of the interactive element, e.g., above the interactive element, as shown in FIG. 3, to the left or right of, or below the interactive element, to notify the user that the server computer 101 has started the activation timer and will execute the server-based action associated with the interactive element, (in this example, the menu button) once the activation timer at the server computer 101 expires. In one advantageous implementation, the activation timer started by the computing device 100 is shorter than the activation timer at the server computer 101 in order to account for the roundtrip delay of the activation message and its response thereto.

Once the activation timer expires 107 at the server computer 101, the server computer 101 initiates 108 the server-based action. In the example shown in relation to FIGS. 2 to 5, the server-based action is the provision of data for displaying the next lower menu level on the computing device 100. Hence, the server computer 101 generates the necessary graphical user interface information for the menu elements and sends 109 it to the computing device 100 in an initiation message. The computing device 100 receives the initiation message and the data contained therein and displays 110 the new menu elements as new interactive elements on the graphical user interface. In one example, the menu elements of the next lower level are related to the content to which the interactive element is linked. For example, if the interactive element is associated with some document, the menu may offer to view/edit, print, or save the document, or if the interactive element is associated with some music file, the menu may offer to add it to some wish-list, to play the music file, to save it, or to share it with other users.

Figure 4:
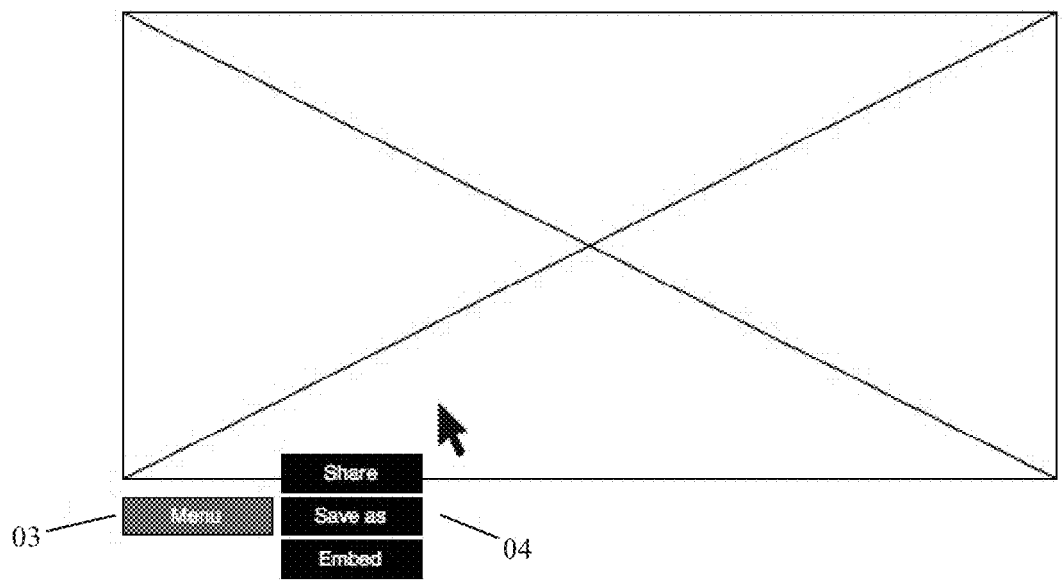

As exemplarily shown in FIG. 4, the new menu elements 04 ("Share," "Save as," and "Embed") are shown to the right of the initially displayed and hovered menu element "Menu." Optionally, the interactive element "Menu" for which the associated server-based action caused the provision of the new menu elements and their display may change its appearance 03, e.g., by changing color, transparency, etc., to have the user focus on the new menu elements. It should be noted that in the time period between displaying and hovering over the menu element "Menu" and the display of the further menu elements as a result of the execution of the server-based action, the user maintains the pointer hovered over the menu element "Menu."

The user may now move the pointer over one of the new menu elements, which are interactive elements, and their associated server-based action again can be initiated by hovering over the respective interactive element for a predetermined amount of time, as described previously herein. Optionally, the user may also cause an immediate execution of the associated server-based functionality by clicking on one of the interactive elements.

Figure 5:
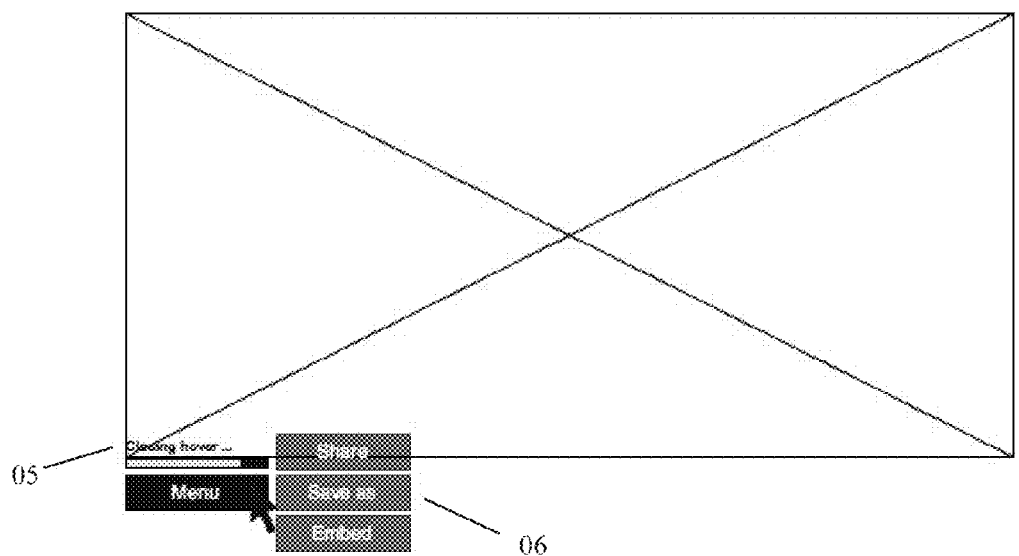

Moreover, as shown in FIG. 5, in case the user moves a pointer from the new interactive elements (i.e., the menu elements "Share," "Save as," and "Embed") back to the interactive element that triggered their display (i.e., the menu element "Menu"), the computing device may start a closing timer (also referred to as deactivation timer herein), upon expiration of which the new interactive elements are removed from the graphical user interface again. The computing device may optionally indicate the closing timer as a visual indicator 05 of the running timer to the user. The time bar in FIG. 5 shows the time left before the new interactive elements are closed (e.g., removed from display), if the user maintains the pointer hovered over the interactive element "Menu." Optionally, a visual indication 06 (e.g., changing the color, transparency, etc.) of the interactive element(s) to be closed/removed may be provided in the graphical user interface, in case the user moves off the new interactive element(s) back to an interactive element of a higher level menu element. If the new interactive element(s) are closed, the interactive element "Menu" may optionally change appearance again, e.g., as shown in FIG. 2.

It should be noted that the change in the appearance of interactive elements may also be used to guide the user as to which interactive elements provide further server-based actions. For example, in a cascaded menu, a visual indication may be provided by changing the appearance of the interactive elements in order to indicate to the user of the computing device which of the interactive elements (which may be of different hierarchical levels of a menu structure or the like) can be currently "activated" by hovering over them.

It also should be noted that more than two menu levels may be implemented by providing interactive elements in each menu level, the server-based action of which provides further interactive elements of the next lower menu level to the computing device for display to the user.

FIGS. 6 to 9 show another exemplary user interface displayed to the user of the computing device during the different steps of execution of the method according to FIG. 1. While the example given with respect to FIGS. 2 to 5 above has been made in connection with a cascaded menu, FIGS. 6 to 9 are referenced to describe an exemplary embodiment of the description, where the description is practiced in the environment of an online shop.

Figure 6:
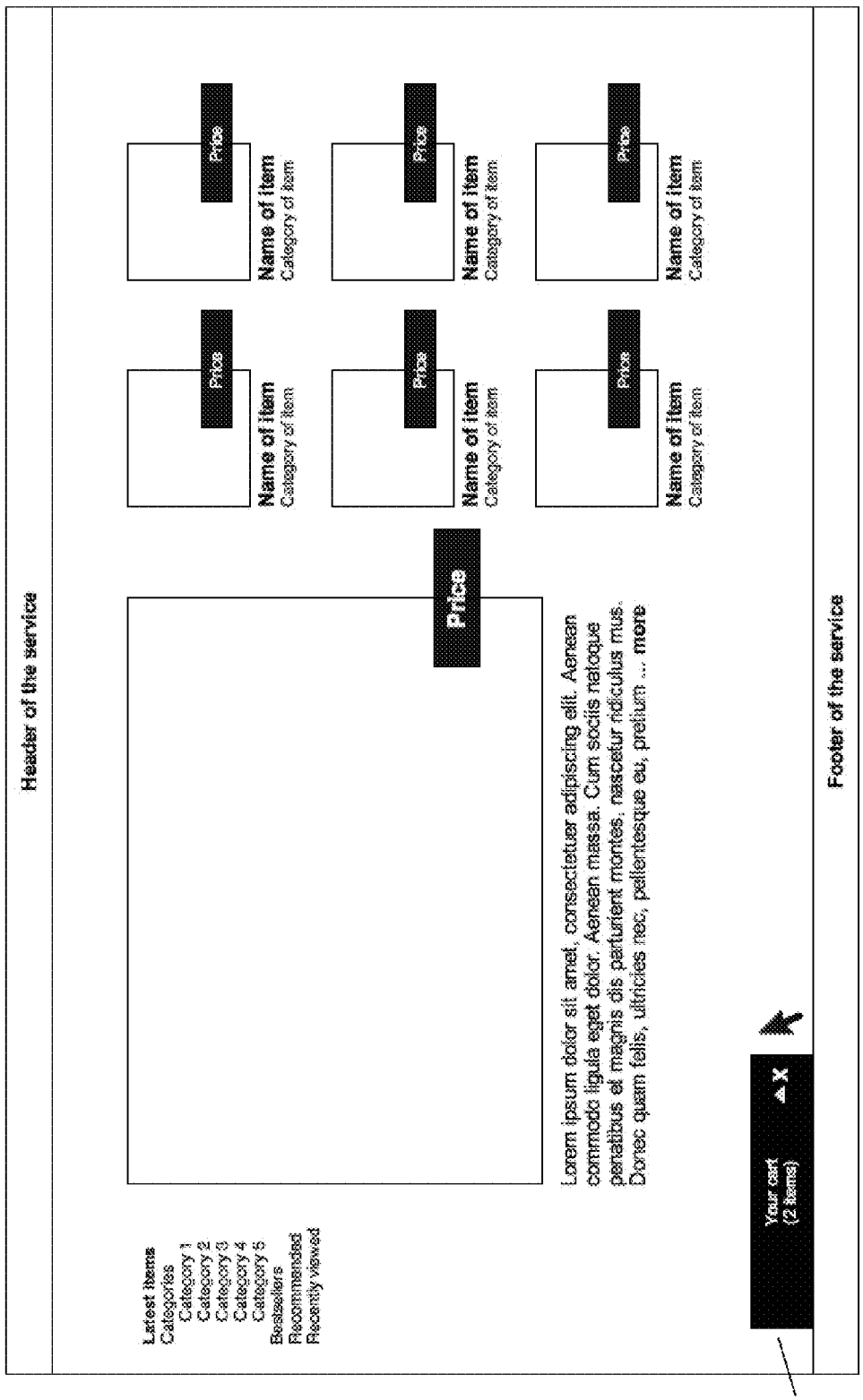

FIG. 6 shows a simplified user interface of an online shopping application, which may be viewed, for example, in a browser window. In the main display area of the user interface, the user can navigate and select individual products and add them to his/her shopping cart. The graphical user interface also shows an interactive element associated with the shopping cart of the user and a related server-based function. In FIG. 6, the interactive element for the shopping cart is shown on the bottom left-hand side of the graphical user interface for exemplary purposes only. In a non-hovered state, the interactive element (shopping cart) is shown in a default state or closed state 11, and may be, for example, displayed as a small icon or button on the screen.

Figure 7:
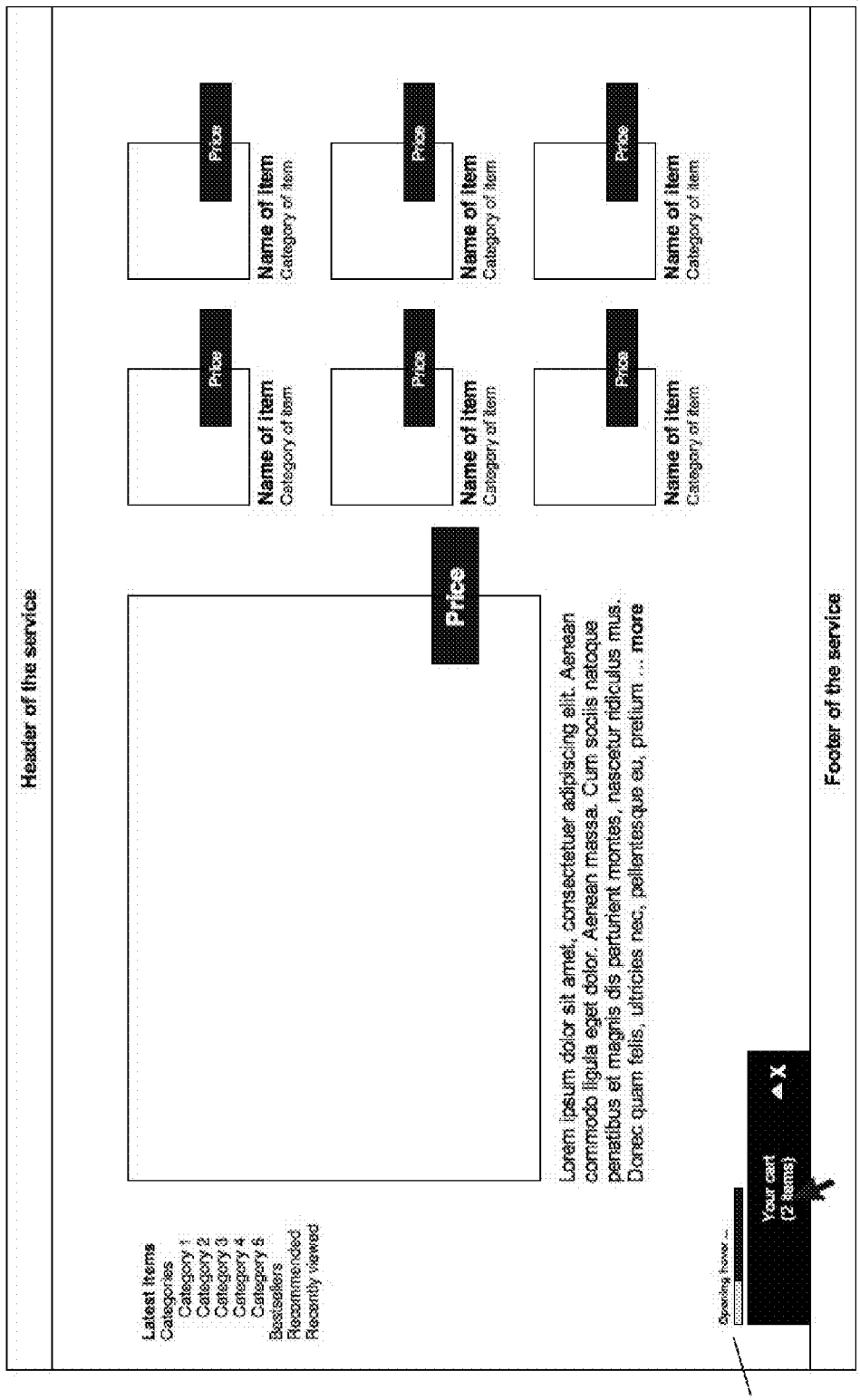

Similar to the example given with respect to FIGS. 1 to 5 above, the user hovers a pointer over the interactive element representative of the shopping cart, as shown in FIG. 7. The hovering event is detected 102 by the computing device 100, and the computing device 100 informs 103 the server computer 102 on the hover event so as to cause the server computer 101 to start 104 the activation timer for the hovered interactive element, and respectively the server-based function associated therewith. Furthermore, in this example, the server computer 101 acknowledges 105 the receipt of the activation message/start of the activation timer by sending a confirmation message back to the computing device 100. This response may cause the computing device 100 to start 106 a local activation timer—which may take into account the roundtrip delay due to the activation message and the confirmation message (see also the description of FIG. 1 above).

As shown in FIG. 7, a visual indicator 12 of the activation timer may be displayed to the user on the graphical user interface next to the interactive element of the shopping cart to indicate to the user that the hovering of the interactive element is about to cause a server-based action. The visual appearance of the interactive element may remain unchanged during the hovering thereof.

Upon expiration 107 of the server-based activation timer, the server computer 101 initiates a server-based action that is associated with the interactive element of the shopping cart. In this example, the server-based action is the generation of data for displaying the content of the shopping cart, delivery information, and billing information. Hence, the server computer 101 generates the necessary graphical user interface information for data for displaying the content of the shopping cart, delivery information, and billing information and sends 109 it to the computing device 100 in an initiation message. The computing device 100 receives the initiation message and the data contained therein and displays 110 the content of the shopping cart, delivery information, and billing information on the graphical user interface (see FIG. 8).

After reception of the initiation message, the interactive element of the shopping cart may optionally change its state 14, which may be visually indicated to the user (e.g., by changing the color, transparency, etc., of the interactive element as shown in FIG. 8). A list of options is displayed 13 next to the interactive element of the shopping cart.

The user is able to open the shopping cart as an overlay window above the shopping site. This allows the user to still keep the shopping experience active and see that it is still active to signal him that he can easily return to the shopping experience without any confusion. In addition, the user does not "click" on anything (yet), e.g., he/she has not committed to buy anything yet, which provides some level of trust and security for the user that no unwanted actions are performed that were not confirmed by the user. The displayed information on the shopping cart content, the billing and delivery information, etc., allow the user to double check the items in the shopping cart, as well as payment and shipping information. This gives the user a feeling of control and improves the shopping experience.

In this exemplary embodiment of the description, the first "click" by the user (using a peripheral input to the computing device) is the final confirmation of the bought goods/services corresponding to the items in his/her shopping cart, the billing information, and the shipping information after having been able to confirm those. Hence, the user "clicks" for the first time on a "checkout" button, so as to finally commit to the purchase. Optionally, the "checkout" function, i.e., final commitment to the purchase, may also be implemented by means of a delayed server-based action, as will be described below with respect to FIGS. 10 to 12.

Figure 9:
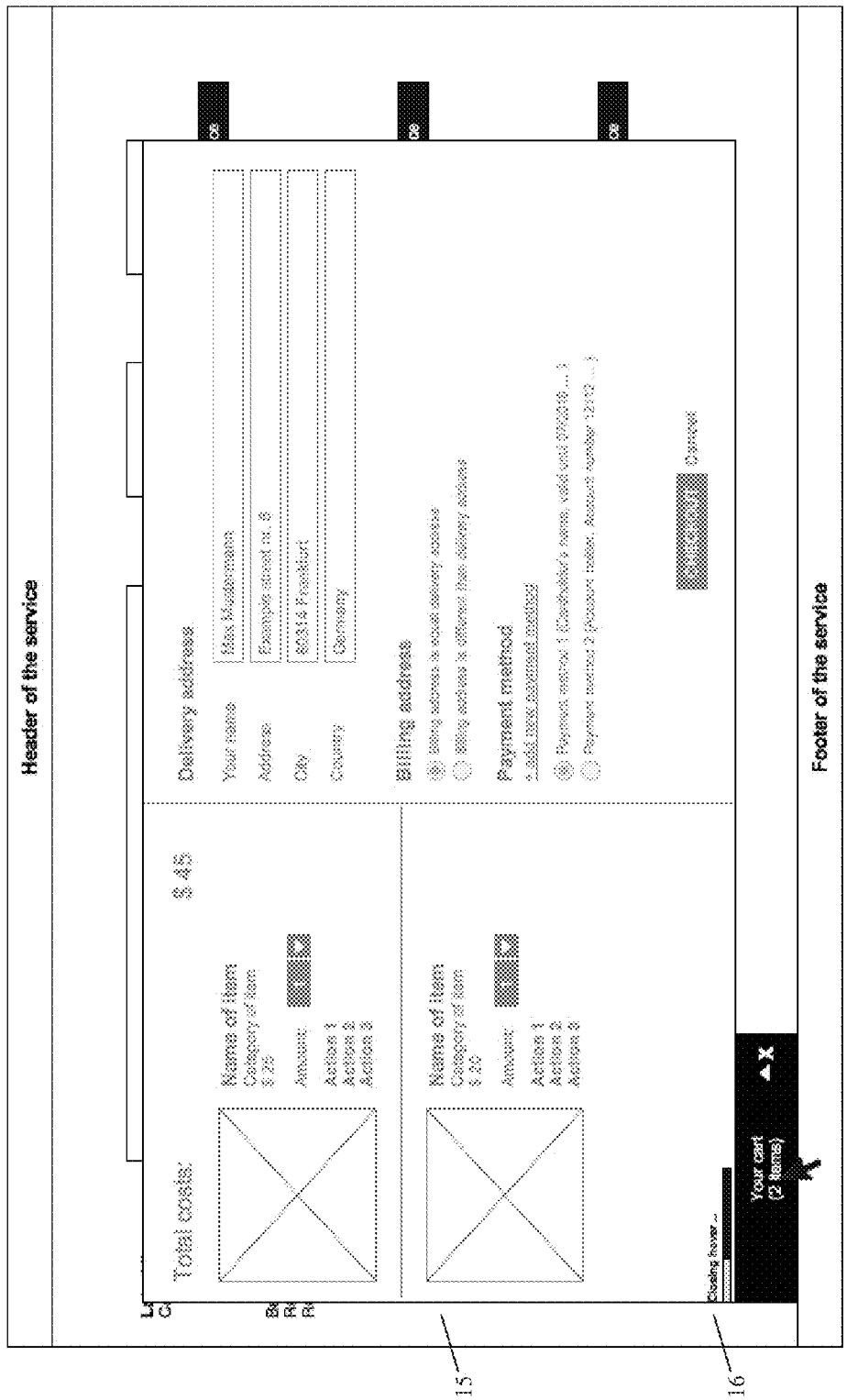

Upon the display of the shopping cart, the billing information and shipping information, the user may also continue shopping. As shown in FIG. 9, the user may move the pointer back over the interactive element of the shopping cart. As the user is not choosing one of the selectable options and has moved back to the starting interactive element, the computing device 100 may start a closing timer and may display a visual indicator 16 of the closing timer to signal the impending closing of the hover. Optionally, the selectable options change their visible state to signal to the user that none is selected 15. Upon the expiration of the closing timer, the computing device 100 displays the original interactive element for the shopping cart, as exemplarily shown in FIG. 6.

Optionally, as shown in FIG. 8, the user may also have the possibility to "click" a cancel button, which would immediately close the shopping cart.

Figure 10:
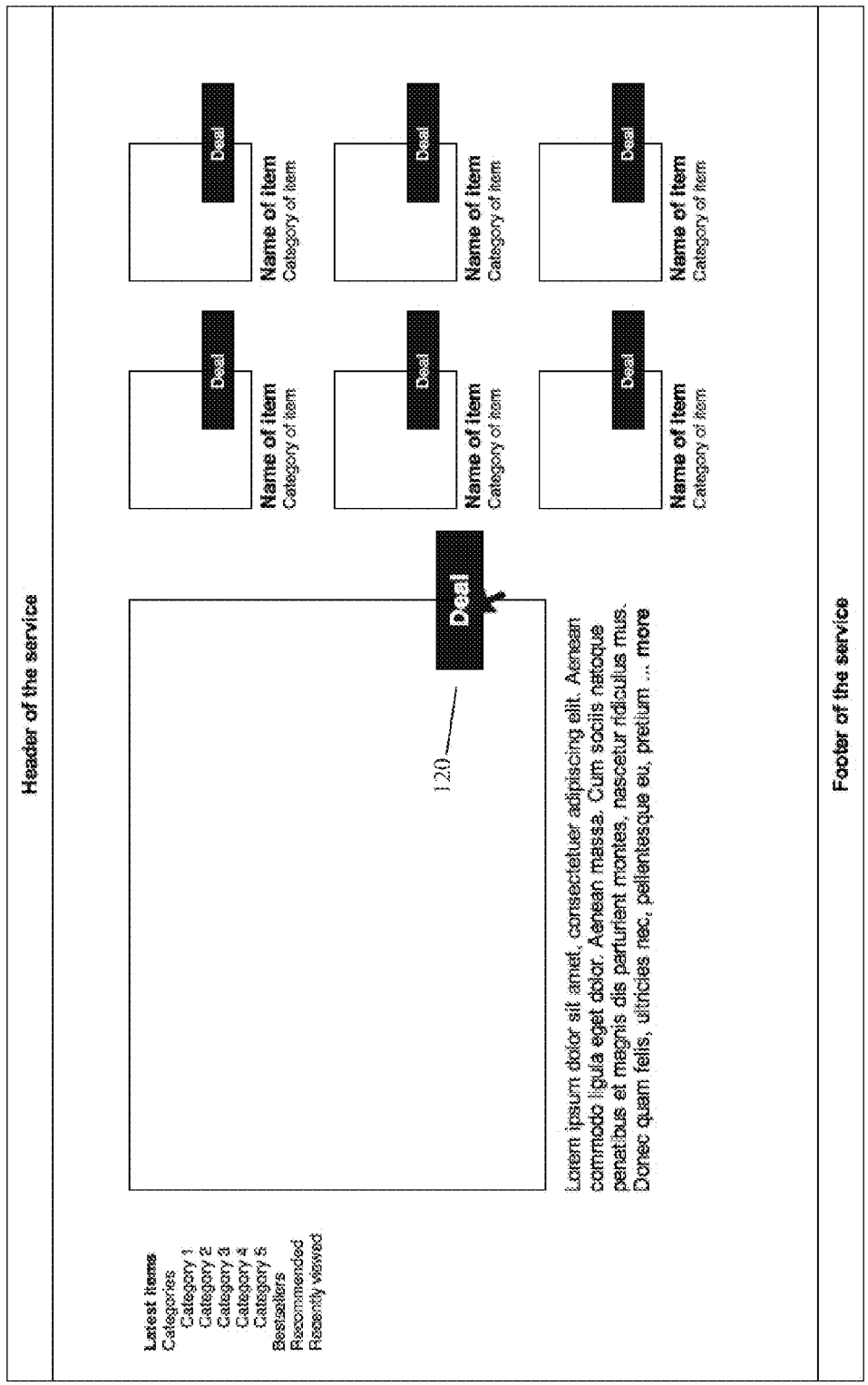
FIGS. 10-12 show the user interface presented to the user of the computing device while execution of the method according to FIG. 1 proceeds, according to a third exemplary embodiment of the description.
Figure 11:
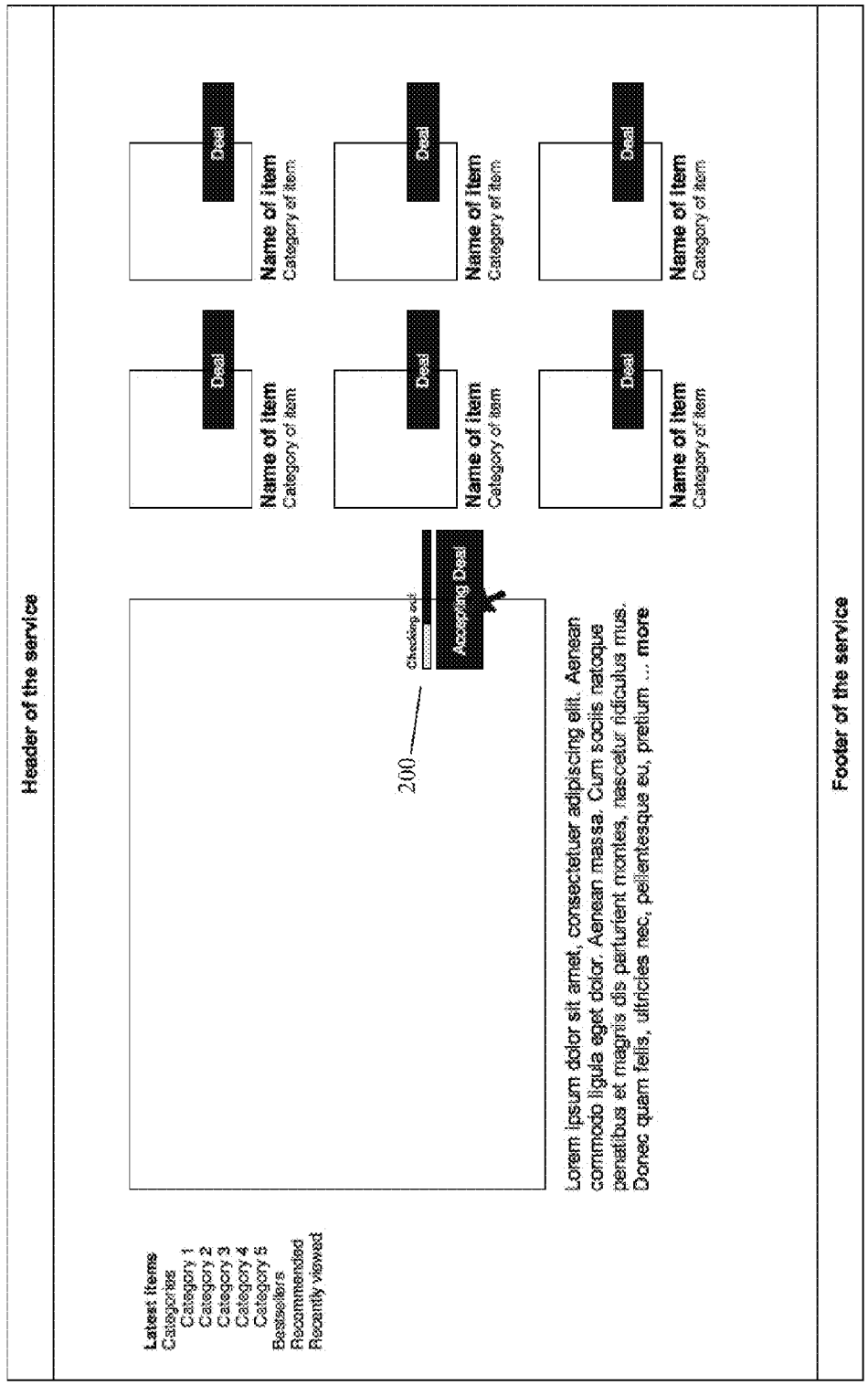
Figure 12:
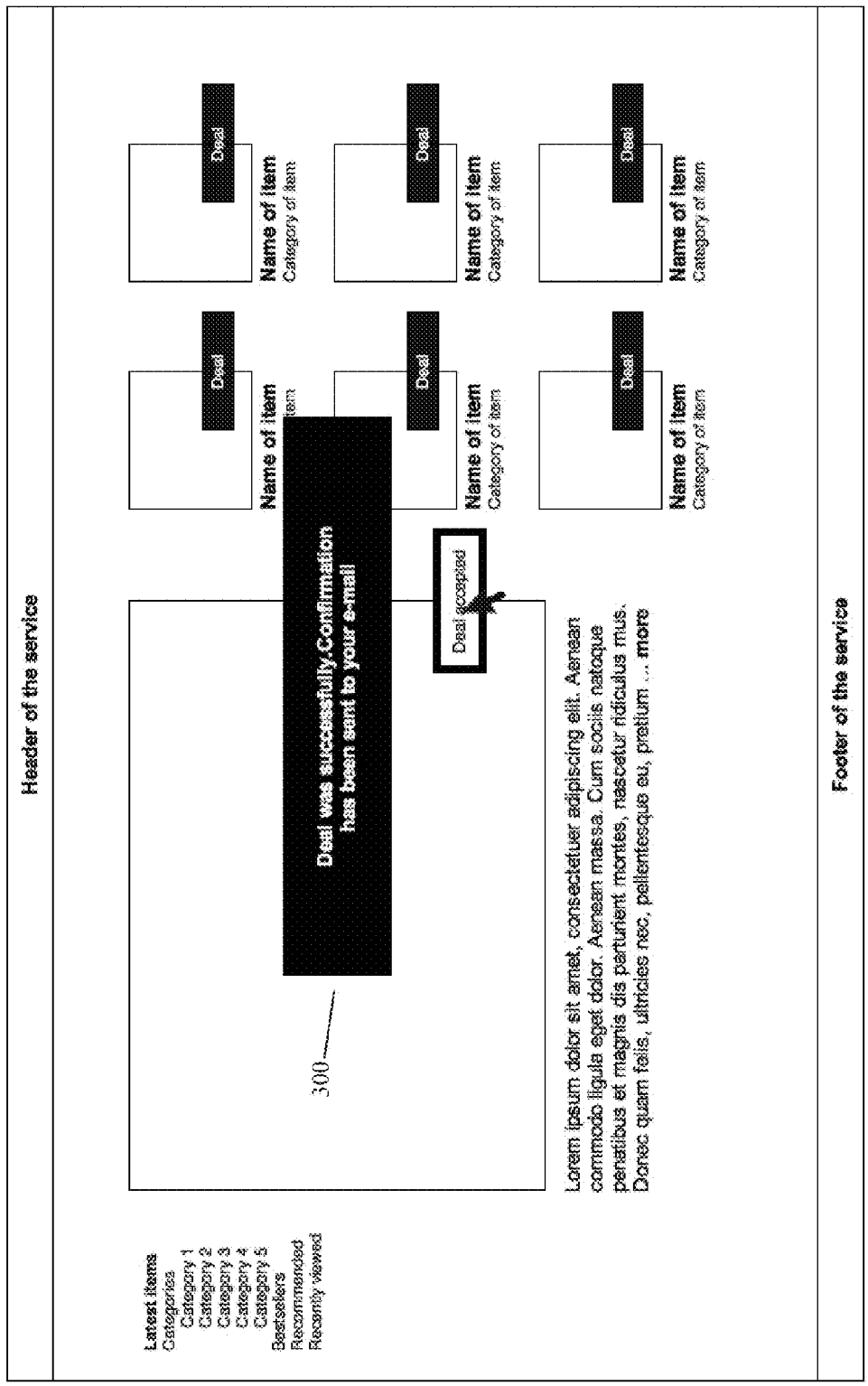

FIGS. 10 to 12 show another exemplary user interface displayed to the user of the computing device during the different steps of execution of the method according to FIG. 1, in which a click-less purchase of an item in an online shop is realized. Essentially, the graphical user interface of the online shopping application as shown in FIG. 10 is similar to that of FIG. 6, except that no shopping cart is shown. This is because the items that can be purchased in this example are individually purchased/checked out, as will be outlined below in further detail. However, it would also be possible to provide a shopping cart as in the example discussed with respect to FIGS. 6 to 9 above, while some of the items may be individually checked out, as will be described below.

In FIG. 10, individual items of goods/services that can be purchased in the online shop are shown to the user together with an associated interactive element 120 (see the "Deal" button) displayed next to the respective item, which allows a direct purchase and respective checkout. Billing information and shipping information of the user may be configured in the online shop so that items may be purchased/checked out without requiring any additional input from the user other than a confirmation of the purchase.

In this exemplary embodiment, the confirmation of the purchase is provided by hovering over the interactive element associated with an item to be purchased for a predetermined amount of time, e.g., on the order of a few seconds (500 ms, 1 s, 2 s, 3 s, 4 s, or 5 s, or the like). This amount of time may be configurable by the user. Similar to the previous examples, the user initiates the purchase by hovering a pointer over the interactive element of an item to be purchased.

The hovering event is detected 102 by the computing device 100, and the computing device 100 informs 103 the server computer 102 on the hover event so as to cause the server computer 101 to start 104 the activation timer for the hovered interactive element and the server-based function associated therewith. Furthermore, in this example, the server computer 101 acknowledges 105 the receipt of the activation message/start of the activation timer by sending a confirmation message back to the computing device 100. This response may cause the computing device 100 to start 106 a local activation timer—which may take into account the roundtrip delay due to the activation message and the confirmation message (see also the description of FIG. 1 above).

As shown in FIG. 11, a visual indicator 200 of the activation timer may be displayed to the user in the graphical user interface next to the interactive element of the shopping cart to indicate to the user that hovering over the interactive element is about to cause a server-based action to purchase/checkout the associated item of the online shop. The visual appearance of the interactive element may change during the hovering thereof, e.g., to indicate that the acceptance of the deal is ongoing due to hovering over the interactive element, as exemplified in FIG. 11.

Upon expiration 107 of the server-based activation timer, the server computer 101 initiates a server-based action that is associated with the interactive element of the shopping cart. In this example, the server-based action is the purchase of the item associated with the interactive element that caused the activation timer to run. Hence, the server computer 101 initiates all necessary actions for shipping the purchased item to the user (in case the purchased item is a physical item) and for invoicing the user for his/her purchase. Moreover, data for displaying a confirmation of the purchase/checkout and optionally an electronic invoice are generated by the server computer 101, which sends 109 it to the computing device 100 in an initiation message.

When some kinds of items are purchased, such as tangible goods and/or intangible items, e.g., some software, media files, gaming items, skins for applications, game characters, or avatars, the server computer 101 may also return information or coded information (e.g., activation key, link, electronic voucher, etc.) within the initiation message to the computing device 100, which can be presented to the user to allow him/her to access or download the purchased item(s). Alternatively, the server computer 101 may also include information within the initiation message to indicate how the purchased item is made available to the user (e.g., a notification that the item is now available in-game). A further alternative is that the server computer 101 informs an application on the server computer 101 or another application server on the purchase, so that the next time the user is executing the application or is logging into a service or game provided by the server, respectively, the purchased item(s) is/are available to the user.

The computing device 100 receives the initiation message and the data contained therein and displays 110 the confirmation 300 of the checkout to the user shown in FIG. 12. Optionally, the computing device 100 may also display a link to allow the user to download or view an electronic invoice for the purchase. Furthermore, as also shown in FIG. 12, the appearance of the interactive element that is used to trigger the purchase may also be changed, e.g., to also reflect the successful purchase ("Deal accepted").

FIGS. 13 to 16 show another exemplary user interface displayed to the user of the computing device during the different steps of execution of the method according to FIG. 1, in which a purchase of an item in an online shop is realized. The embodiment of the description described with respect to FIGS. 13 to 16 can be considered a variant of the embodiment described with respect to FIGS. 10 to 12—in this embodiment of the description, an additional step for explicitly confirming the purchase is introduced. This confirmation can be achieved in a "clickless" fashion or by clicking on a predetermined information element, as will be explained below.

Figure 13:
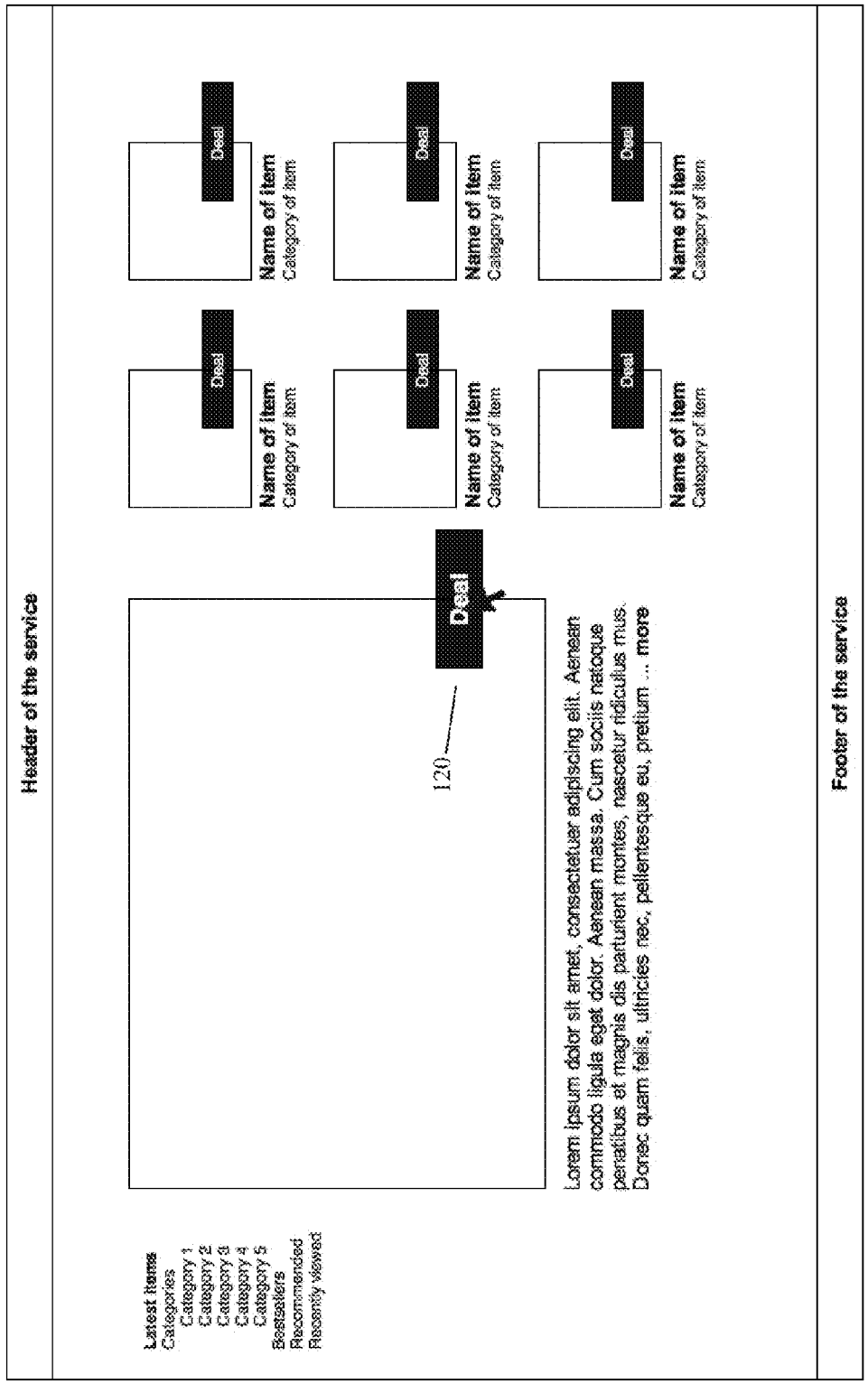
FIGS. 13-16 show the user interface presented to the user of the computing device while execution of the method according to FIG. 1 proceeds, according to a fourth exemplary embodiment of the description.
Figure 14:
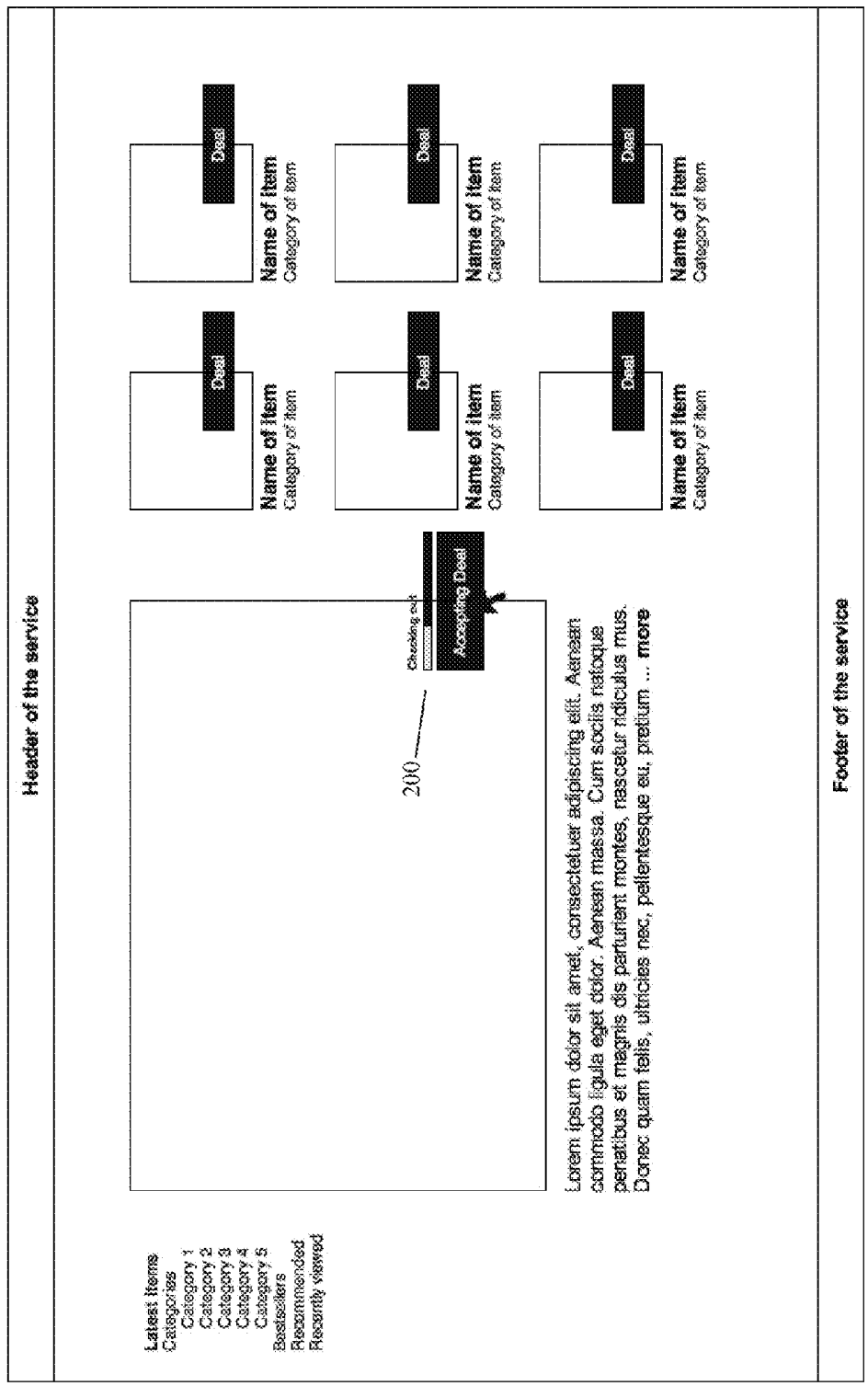

FIGS. 13 and 14 correspond to FIGS. 10 and 11 so that reference is made to their description above. Upon expiration 107 of the server-based activation timer, the server computer 101 initiates server-based action that is associated with the interactive element of the shopping cart. In this example, the server-based action is the generation of data for displaying a further interactive element which is associated with a server-based action to confirm the purchase. The generated data is sent 109 by the server computer 101 to the computing device 100 in an initiation message.

Figure 15:
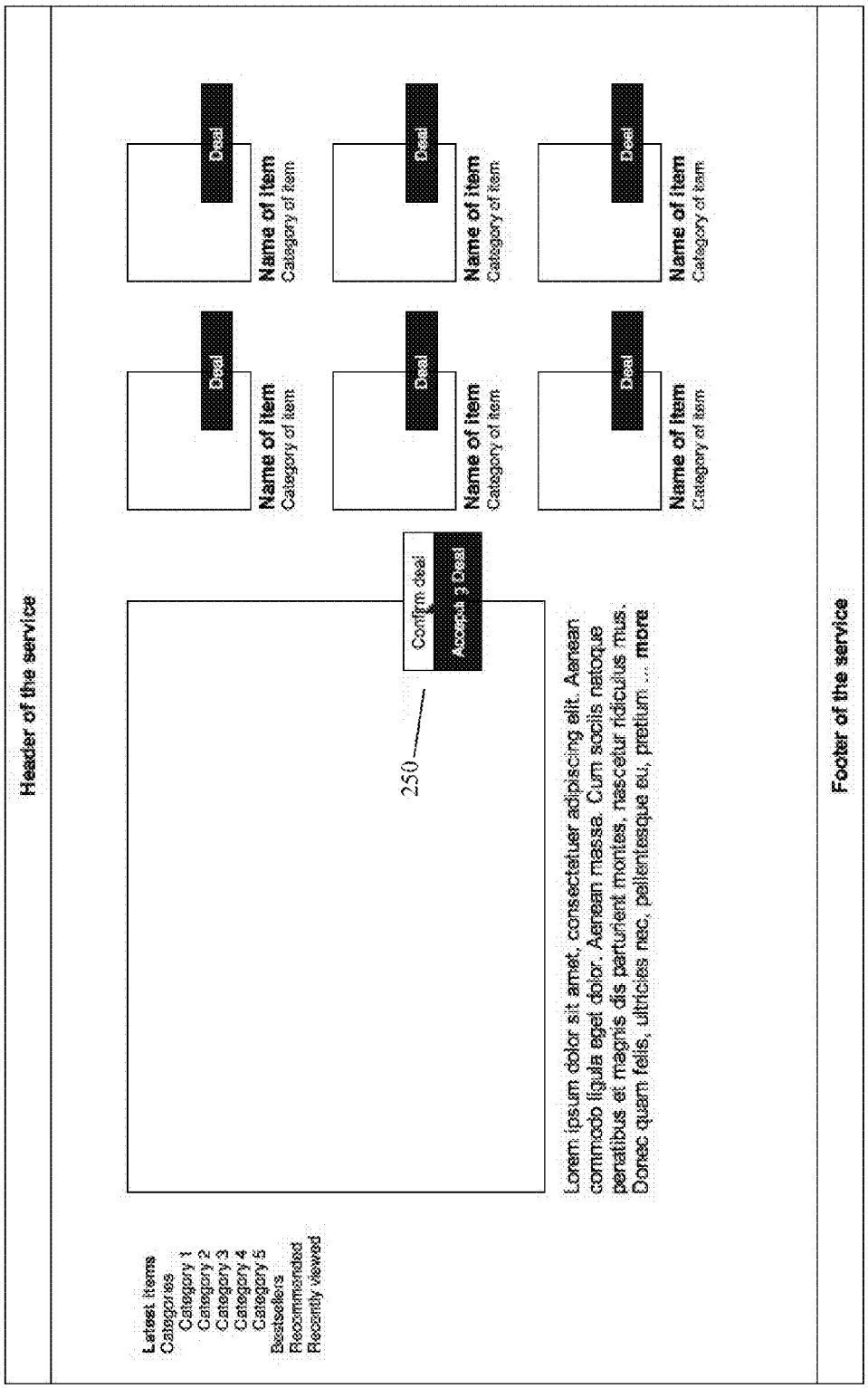

Upon reception of the initiation message, the computing device 100 displays the further interactive element which is associated with a server-based action to confirm the purchase to the user. In FIG. 15, this further interactive element 250 is shown as the button "Confirm deal" which is displayed next to the information element "Accepting Deal." In one exemplary implementation, the user may click on the button "Confirm deal," which would cause the computing device 100 to trigger the server computer to perform a server-based action to check out the item(s) to be purchased, as described previously with respect to FIG. 12. Alternatively, the user may not need to click the button "Confirm deal" for confirming the purchase, but may simply hover over the button "Confirm deal" for a predetermined amount of time to initiate the server-based action to check out the item(s) to be purchased, as described previously with respect to FIG. 12.

If the user moves off the button "Confirm Deal," the computing device 100 may start a closing timer and may remove the button "Confirm Deal" after its expiration. This closing operation may include the display of a visual indicator of the closing counter, as has been described above.

As explained with respect to FIG. 12 previously herein, once the user has confirmed the purchase by either hovering over the button "Confirm Deal" for a predetermined time span or clicking the button "Confirm Deal," the server computer 101 will perform the necessary actions to execute the purchase. For example, the server computer 101 may initiate all necessary actions for shipping the purchased item to the user (in case the purchased item is a physical item) and for invoicing the user for his/her purchase. Moreover, data for displaying a confirmation of the purchase/checkout and optionally an electronic invoice are generated by the server computer 101 which sends 109 it to the computing device 100 in an initiation message.

Figure 16:
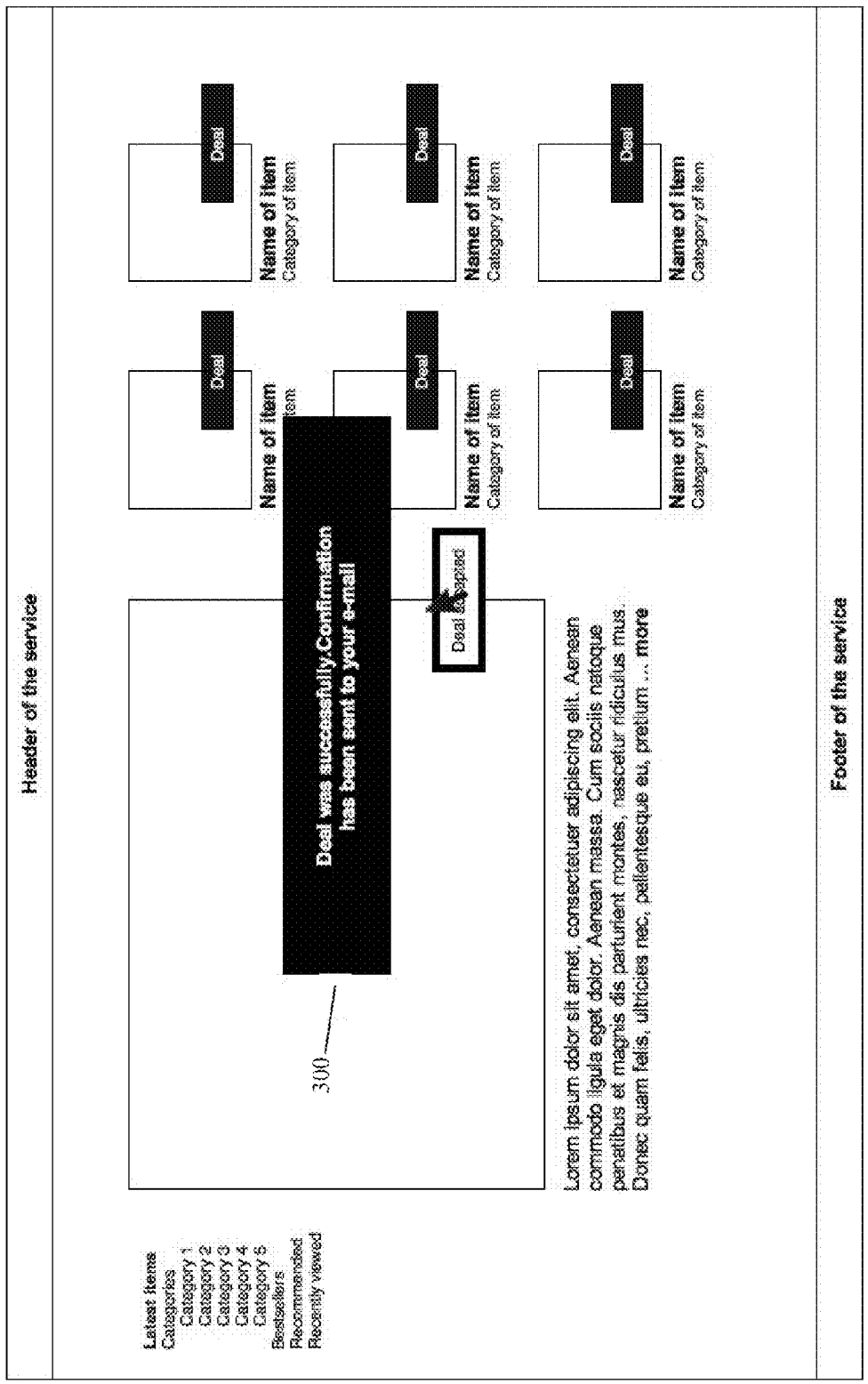

The computing device 100 receives the initiation message and the data contained therein and displays 110 the confirmation 300 of the checkout to the user shown in FIG. 16. Optionally, the computing device 100 may also display some link to allow the user to download or view an electronic invoice for the purchase. Furthermore, as also shown in FIG. 16, the appearance of the interactive element that was used to trigger the purchase may also be changed, e.g., to also reflect the successful purchase ("Deal accepted").

In one further exemplary implementation, each of the interactive elements may be associated with a data structure, a so-called container or seed as, for example, known from co-pending U.S. patent application Ser. No. 13/609,046, entitled "Management of Online Content in a Network," filed on Sep. 10, 2012, which claims the benefit of U.S. Provisional Application No. 61/533,842, filed on Sep. 13, 2011, the entire disclosures of which are incorporated herein by reference. Specifically, a seed could be defined for an individual interactive element and its associated action. A seed could therefore, for example, maintain information on the action to be triggered (and optionally further actions which could be performed with this seed). Moreover, the seed of an interactive element could be indicative or include data for generating its display at the computing device 100.

As also noted above, the description is also related to the implementation of the different methods for triggering a delayed server-based action as, for example, discussed with respect to FIGS. 1 to 16 herein, in software and hardware or a combination thereof. The various embodiments of the description may also be performed or embodied by a combination of computing devices and software programs providing the desired functionality stored on any kind of computer readable storage media, for example, RAM, EPROM, EEPROM, flash memory, registers, hard disks, CD-ROM, DVD, etc.

It should be further noted that various individual features of the different embodiments of the description may be used or implemented individually or in combination within the scope of the claimed subject matter.

It would be appreciated by a person skilled in the art that numerous variations and/or modifications may be made to the present description as shown in the specific embodiments without departing from the spirit or scope of the description as broadly described. The present embodiments are, therefore, to be considered in all respects to be illustrative and not restrictive.

The embodiments of the invention in which an exclusive property or privilege is claimed are defined as follows:

1. A method for initiating a server-based action comprising:
   displaying a user interface on a display of a computing device, the user interface having at least one interactive element associated with a server-based action;
   detecting hovering of a pointer over an interactive element on the user interface using an input peripheral of the computing device;
   informing a server on the pointer being hovered over an interactive element associated with a respective server-based action to thereby cause a timer associated with the respective server-based action to be started at the server;
   upon expiration of the timer at the server, initiating at the server the server-based action associated with the hovered interactive element;
   starting an initiation timer at the computing device in response to the pointer being hovered over the interactive element; and
   displaying the initiation timer on the user interface for indicating the time left before the hovering of the interactive element starts the associated server-based action at the server, wherein the initiation timer at the computing device is started in response to the server confirming the start of the timer associated with the server-based action at the server.

2. The method according to claim 1, further comprising:
   the server informing the computing device on the initiation of the server-based action; and
   providing by the computing device information to the user, wherein the information is indicative of the server-based action having been initiated.

3. The method according to claim 2, wherein the information is provided to the user visually in the user interface and/or acoustically, or wherein the information is displayed as an overlay.

4. The method according to claim 2, wherein the information is a further interactive element associated with a further server-based action, or wherein the information is a user interface for interfacing with the initiated server-based action.

5. The method according to claim 1, further comprising:
   the computing device informing the server that the interactive element is no longer hovered over by the pointer; and
   interrupting the timer for the associated server-based action at the server.

6. The method according to claim 1, further comprising:
   confirming at the computing device the server-based action associated with the hovered interactive element by the user using an input peripheral of the computing device while the timer is running at the server;
   in response to the confirmation of the server-based action by the user, the computing device informing the server on the confirmation of the server-based action by the user; and
   initiating the server-based action at the server in response to the information received from the computing device.

7. The method according to claim 1, wherein the initiated server-based action associated with the hovered interactive element for which the server-based timer expired causes the server to transmit at least one further interactive element to the computing device, each further interactive element being associated with a server-based action, and
   wherein information displayed on the user interface of the computing device display includes the at least one further interactive element for selection by the user, wherein the further interactive element is displayed in close proximity to the hovered interactive element to represent a menu structure from which the user can select.

8. The method according to claim 7, further comprising:
   starting a deactivation timer at the computing device in response to the display of the at least one further interactive element;
   displaying the deactivation timer on the user interface for indicating the time left before deactivating the at least one further interactive element displayed on the user interface; and
   removing the at least one further interactive element from the displayed user interface upon expiration of the deactivation timer.

9. The method according to claim 7, further comprising:
   hovering a pointer over one of the at least one further interactive element on the user interface using an input peripheral of the computing device;
   informing a server on the pointer being hovered over said one further interactive element associated with a respective server-based action to thereby cause a timer associated with the respective server-based action to be started at the server; and
   upon expiration of the timer at the server, initiating at the server the server-based action associated with said hovered further interactive element.

10. The method according to claim 1, wherein the interactive element is associated with a seed maintained by the server and the timer at the server associated with said seed.

11. The method according to claim 1, wherein the server provides functionality of a social network or an online platform and the interactive elements are associated with server-based actions of the social network or online platform.

12. The method according to claim 1, wherein the user interface is streamed from the server to the computing device as a multimedia stream.

13. A computer server comprising:
   a transmission circuit configured to provide to a computing device a user interface for display to a user of the computing device, the user interface having at least one interactive element associated with a server-based action;

a reception circuit configured to receive from the computing device an activation message that a pointer hovered over an interactive element associated with a respective server-based action;

a timer circuit configured to start an activation timer associated with the respective server-based action in response to receiving said activation message from the computing device; and a processing circuit configured to initiate the server-based action associated with the hovered interactive element upon expiration of the activation timer, wherein the computing device is configured to start an initiation timer at the computing device in response to the pointer being hovered over the interactive element, and display the initiation timer on the user interface for indicating the time left before the hovering of the interactive element starts the associated server-based action at the computer server, wherein the initiation timer at the computing device is started in response to the computer server confirming the start of the timer associated with the server-based action at the computer server.

14. The computer server according to claim 13, wherein the transmission circuit is further configured to transmit a message to the computing device to inform the computing device on the initiation of the server-based action.

15. The computer server according to claim 14, wherein information transmitted to the computing device includes at least one further interactive element associated with a further server-based action, or wherein the information transmitted to the computing device includes a user interface for interfacing with the initiated server-based action.

16. The computer server according to claim 13, wherein the reception circuit is further configured to receive an interrupt message from the computing device informing the computer server that the interactive element is no longer hovered over by the pointer, wherein the timer circuit is further configured to interrupt the timer for the associated server-based action responsive to the interrupt message.

17. The computer server according to claim 13, wherein the reception circuit is further configured to receive a confirmation message for a server-based action associated with an interactive element from the computing device indicating to the computer server to initiate the server-based action for which a timer is running at the computer server for said server-based action, wherein the processing circuit is further configured to initiate the server-based action in response to the confirmation message received from the computing device.

18. The computer server according to claim 13, wherein the initiated server-based action associated with the hovered interactive element for which the server-based timer expired is causing the transmission circuit of the computer server to transmit at least one further interactive element to the computing device, each further interactive element being associated with a server-based action, wherein the reception circuit is further configured to receive another activation message from the computing device, wherein the other activation message indicates that a pointer hovered over one of the at least one further interactive element associated with a respective server-based action, wherein the timer circuit is further configured to start another activation timer associated with the respective server-based action in response to receiving said other activation message from the computing device, and wherein the processing circuit is configured to initiate the server-based action associated with said hovered further interactive element upon expiration of the other activation timer.

19. A computing device comprising:

a display configured to display a user interface, the user interface having at least one interactive element associated with a server-based action;

an input peripheral configured to provide input to the computing device, wherein the input peripheral is configured to allow the user to hover a pointer over an interactive element on the user interface;

a transmission circuit configured to transmit an activation message to a server, wherein the activation message informs the server on the pointer being hovered over an interactive element associated with a respective server-based action;

a reception circuit configured to receive a message from the server informing the computing device on the initiation of the server-based action;

an output circuit configured to provide visual and/or acoustical information to the user, wherein the information is indicative of the server-based action having been initiated; and a timer circuit configured to start an initiation timer in response to the pointer being hovered over the interactive element, wherein the display is configured to display the initiation timer on the user interface in close proximity to the hovered interactive element for indicating the time left before hovering over the interactive element starts the associated server-based action at the server.

20. The computing device according to claim 19, wherein the input peripheral is further configured to receive a confirmation of the server-based action associated with the hovered interactive element by the user while the activation timer associated with the server-based action is running at the server, and wherein the transmission circuit is further configured to transmit, in response to the confirmation of the server-based action by the user, a confirmation message to the server to cause an immediate initiation of the server-based action at the server.

21. A method for initiating a server-based action, comprising:

displaying a user interface on a display of a computing device, the user interface having at least one interactive element associated with a server-based action;

detecting hovering of a pointer over an interactive element on the user interface using an input peripheral of the computing device;

informing a server on the pointer being hovered over an interactive element associated with a respective server-based action to thereby cause a timer associated with the respective server-based action to be started at the server;

upon expiration of the timer at the server, initiating at the server the server-based action associated with the hovered interactive element, wherein the initiated server-based action associated with the hovered interactive element for which the server-based timer expired causes the server to transmit at least one further interactive element to the computing device, each further interactive element being associated with a server-based action, and wherein information displayed on the user interface of the computing device display includes the at least one further interactive element for selection by the user, wherein the further interactive element is displayed in close proximity to the hovered interactive element to represent a menu structure from which the user can select, starting a deactivation timer at the computing device in response to the display of the at least one further interactive element;

displaying the deactivation timer on the user interface for indicating the time left before deactivating the at least one further interactive element displayed on the user interface; and removing the at least one further interactive element from the displayed user interface upon expiration of the deactivation timer.

* * * * *